ROTATION

| SWITCH | 0° | 30° | 60° | 90° | 120° | 150° | 180° |
|---|---|---|---|---|---|---|---|
| 5TD1 | ○ | ⊗ | ⊗ | ⊗ | ⊗ | ⊗ | ○ |
| 5TD2 | ○ | ○ | ○ | ⊗ | ○ | ○ | ○ |
| 5TD3 | ○ | ⊗ | ○ | ○ | ○ | ○ | ○ |
| 5TD4 | ○ | ⊗ | ⊗ | ⊗ | ⊗ | ⊗ | ○ |

ROTATION

| SWITCH | 0° | 30° | 45° | 90° | 120° | 180° | 172° | 360° |
|---|---|---|---|---|---|---|---|---|
| 6TD1 | ○ | ⊗ | ⊗ | ⊗ | ⊗ | ⊗ | ⊗ | ○ |
| 6TD2 | ○ | ⊗ | ○ | ○ | ○ | ○ | ⊗ | ○ |
| 6TD3 | ○ | ○ | ○ | ⊗ | ○ | ○ | ○ | ○ |
| 6TD4 | ○ | ⊗ | ⊗ | ⊗ | ⊗ | ⊗ | ⊗ | ○ |

INVENTORS
William D. Connors
Marshall E. Evans
BY
ATTORNEYS.

RADIATION RESPONSIVE SELECTIVELY PROGRAMMED CONTROLLER

Filed Sept. 28, 1962 10 Sheets-Sheet 2

INVENTORS
William D. Connors
BY Marshall E. Evans
Parker & Carter
ATTORNEYS.

INVENTORS
William D. Connors
BY Marshall E. Evans
Parker & Prochnow
ATTORNEYS.

RADIATION RESPONSIVE SELECTIVELY PROGRAMMED CONTROLLER
Filed Sept. 28, 1962 10 Sheets-Sheet 4
Fig. 6.
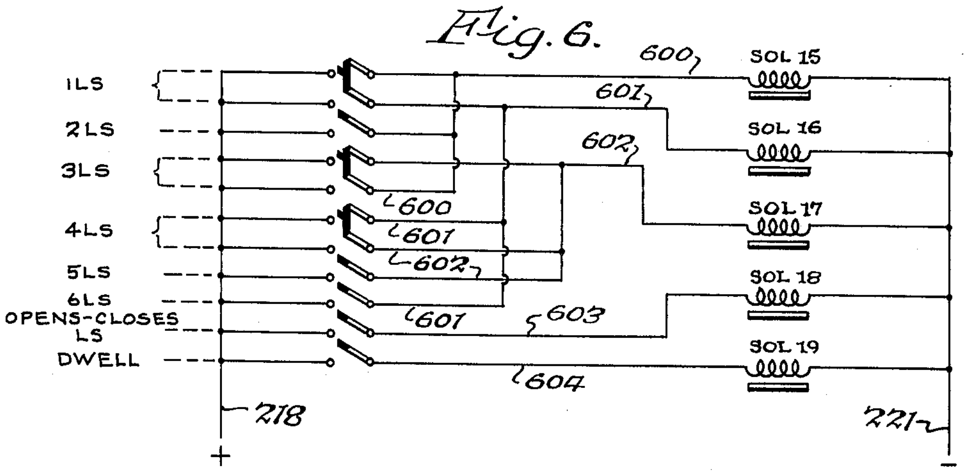
Fig. 7.
| | LS | 15CR | 16CR | 17CR |
|---|---|---|---|---|
| 528 | 1LS | ⊗ | ⊗ | ○ |
| 530 | 2LS | ⊗ | ○ | ○ |
| 527 | 3LS | ⊗ | ○ | ⊗ |
| 521 | 4LS | ○ | ⊗ | ⊗ |
| 520 | 5LS | ○ | ○ | ⊗ |
| 522 | 6LS | ○ | ⊗ | ○ |
Fig. 8.
| LS | 18CR |
|---|---|
| OPENS | ⊗ |
| CLOSES | ○ |
Fig. 9.
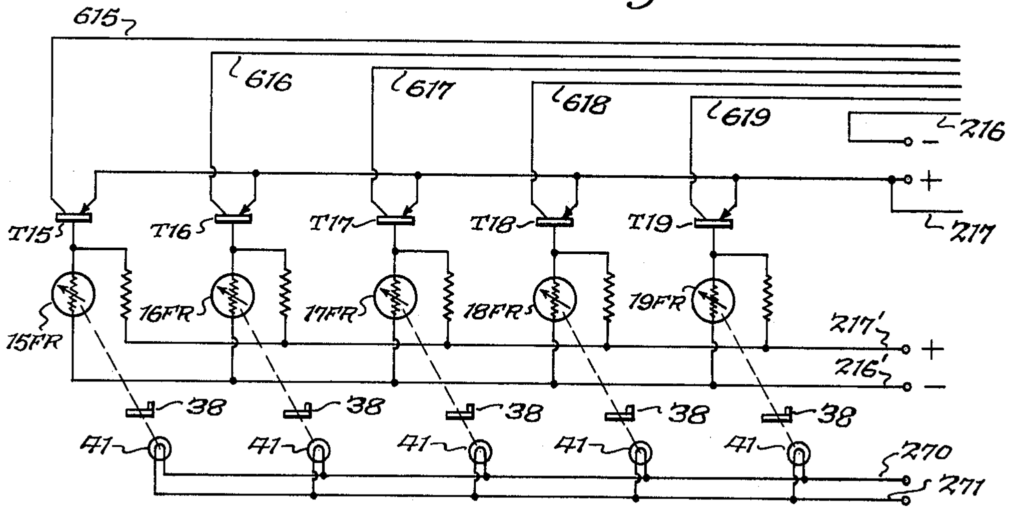
INVENTORS
William D. Connors
BY Marshall E. Evans
Parker & Prochnow
ATTORNEYS.

Dec. 21, 1965 W. D. CONNORS ETAL 3,225,207

RADIATION RESPONSIVE SELECTIVELY PROGRAMMED CONTROLLER

Filed Sept. 28, 1962

10 Sheets-Sheet 5

INVENTORS
William J. Connors
BY Marshall F. Evans
Cooper & Pasternow,
ATTORNEYS

Dec. 21, 1965 W. D. CONNORS ET AL 3,225,207

RADIATION RESPONSIVE SELECTIVELY PROGRAMMED CONTROLLER

Filed Sept. 28, 1962 10 Sheets-Sheet 6

INVENTORS
William D. Connors
Marshall E. Evans
BY Parker & Rodman
ATTORNEYS.

RADIATION RESPONSIVE SELECTIVELY PROGRAMMED CONTROLLER

Filed Sept. 28, 1962 10 Sheets-Sheet 7

INVENTORS
William D. Connors
Marshall E. Evans
BY Parker & Prochnow,
ATTORNEYS.

INVENTORS
William D. Connors
Marshall E. Evans
BY
ATTORNEYS.

INVENTORS
William D. Connors
Marshall E. Evans
BY
Parker & Prochnow,
ATTORNEYS.

INVENTORS
William D. Connors
Marshall E. Evans
BY Parker & Prochnow,
ATTORNEYS.

3,225,207

RADIATION RESPONSIVE SELECTIVELY PROGRAMMED CONTROLLER

William D. Connors, Horseheads, N.Y., and Marshall E. Evans, Millerton, Pa., assignors to Hardinge Brothers, Inc., Elmira, N.Y.

Filed Sept. 28, 1962, Ser. No. 227,019
24 Claims. (Cl. 250—237)

This invention relates to automatic control devices and more particularly to automatic actuators and controllers capable of being programmed whereby the operation of a machine, or other apparatus, and a sequence of operations may be fed into the machine and repeated as many times as desired.

Most programmed controllers are of an extremely complex electronic nature and therefore susceptible to the effects of various detrimental, environmental conditions. In some cases, at great expense, these conditions have been minimized, but the reliability of such devices has always been limited. It is therefore desirable to combine the inherent reliability of a mechanical system with the accuracy and space saving of electronics and evolve a combination of a mechanical-electrical controller. It is therefore an object of this invention to provide an inexpensive, reliable, simple to operate, automatic controller capable of being programmed.

Another object is to provide a controller which may be programmed to repeat a sequence of operations and which employs photo-sensitive elements in conjunction with a shutter system.

Still another object is to provide an electro-mechanical controller employing a minimum of moving parts in addition to simple positive acting electrical components.

Various other objects and advantages will appear from the following description of one embodiment of the invention, and the novel features will be particularly pointed out hereinafter in connection with the appended claims.

In the accompanying drawings:

FIG. 6 is a circuit diagram of the control switches and circuits employed in the automatic cycling of the controller;

FIGS. 7 and 8 are development charts, the switches and relays shown in FIGS. 6 and 7.

FIGS. 9 and 10 are circuit diagrams of an embodiment of the automatic portion of the invention;

In accordance with our invention, programming is accomplished through the medium of a plurality of photosensitive resistors which have a very high resistance to the flow of electric current when dark, but which have a greatly reduced resistance when subject to light or illuminated. These resistors are mounted on a reading head. Light is admitted to one or more of these resistors after passing through holes provided in a movable member having a series of shutter-controlled holes therein. This movable member, in the particular construction illustrated, is in the form of a hollow drum or cylinder having the shutter-controlled holes herein arranged in rows. The drum is rotatable into positions in which one row after another moves opposite the row of holes in the reading head. A suitable light source is arranged on the exterior of the cylinder for projecting light through any of the holes in the cylinder which may be uncovered by the shutters and, consequently by opening certain selected shutters of the cylinder, commands may be detected by means of the photosensitive resistors and these employed to control other electrical devices hereinafter explained.

Figure 19:
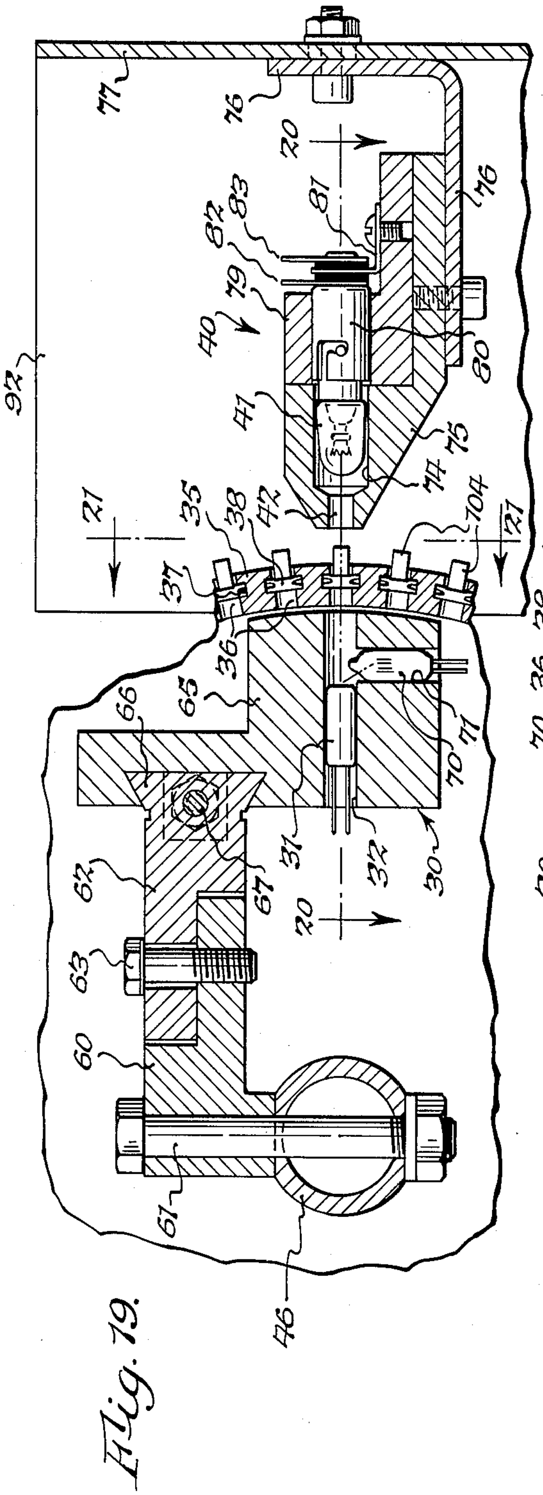
FIG. 19 is another fragmentary, vertical section through the drum approximately along line 19—19, FIG. 15.
Figures 20, 21:
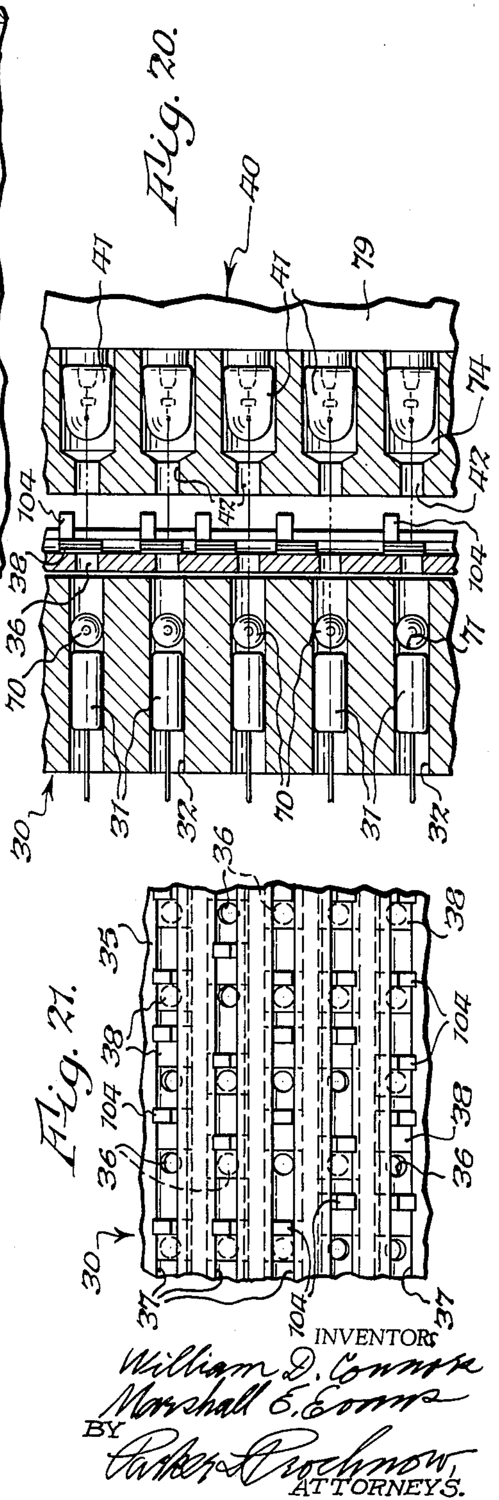
FIG. 20 is a horizontal cross section taken approximately along line 20—20 of FIG. 19.
FIG. 21 is a front elevation taken from approximately line 21—21 of FIG. 19 of a portion of the drum showing its light shutters.

In the illustrated embodiment of FIGS. 19 to 21, the reading head 30 is supported, preferably in an adjustable manner, from a hollow shaft 46 by a bracket 60 which is mounted by bolt 61 to the shaft 46 and by arm 62 whose complementary sliding engaging faces interlock with those of bracket 60 to form a transversely adjustable coupling, and are fastened by bolt 63. The arm 62 has an adjustable connection with the body portion 65 of the reading head which adjustment, for example, may be accomplished by means of a dove-tail type of mounting 66 which permits longitudinal adjustment of the reading head, for example, by means of an adjusting screw or bolt 67 by means of which the reading head may be adjusted and also rigidly secured to the arm or block 62.

The reading head 30 is provided with a row of recesses or as in this case, holes 32 in which are mounted photoconductive cells 31 whose sensitive portions are recessed from the outer surface of the reading head. Photosensitive elements suitable for use herein are of the type manufactured by Clairex Corporation of New York, N. Y., and designated as cadmium selenide photoconductive cells. The general character of photoconductive cells of which these resistors are a form are described in the Electrical Engineers Handbook, 4th Edition, by Pender and McIlwain, published by John Wiley and Sons, Inc., New York. These holes 32 are alined to receive light through holes in a control drum or cylinder 35 having holes 36 therein which are arranged in rows extending parallel to the axis of the cylinder, and a relatively large number of rows of holes are provided about the peripheral surface of the cylinder. Both the number of holes in each row and the total number of rows vary according to the work which the apparatus is required to do and merely by way of example, we have herein provided the row of the reading head and each row of the control drum 35 with twenty-four holes and the cylinder 35 is provided with sixty rows of twenty-four holes each. These holes 36 in the control drum 35 extend through the wall of the drum and are provided with internal grooves or channels 37 which extend approximately parallel to the axis of the drum. These grooves are undercut or of approximately T-shape in cross section, and shutters 38 are arranged to be retained and to slide in these grooves into and out of positions to cover and expose the holes.

Any suitable light-projecting member may be provided on the side of the drum opposite the reading head 30, such as the illuminating head 40, which is provided with a single row of light bulbs or other sources 41. They are arranged therein to project light through openings 42 toward the control drum. Each of the openings 42 being in alinement with the recesses 32 in which the photoconductive cells are arranged. Consequently as the control drum is turned step by step about its axis, light will be passed from the illuminating head through any hole in the control drum which is not covered by its shutter, and through the recess in the reading head alined therewith, to the photoconductive cell therein to actuate certain electrical devices associated therewith.

In the use of the apparatus, the light admitted from the illuminating head 40 to a photoconductive cell is shut off during the periods when the drum is indexing, and it is therefore necessary to provide means for actively maintaining any circuit completed by the cell during the period the same is no longer being acted upon by the light of the illuminating head. For this purpose a maintaining light bulb 70 is provided in a hole 71 in the body portion of the reading head disposed in front of the resistor 31, and electric current supplies to the maintaining light bulb during selected intervals. This light bulb consequently illuminates the photoconductive cell until the maintaining light bulb itself becomes extinguished by means hereinafter explained.

The illuminating head 40 may be of any suitable or desired construction, that shown including a housing 75 provided with openings 74, each of which constitutes an enlarged continuation of the opening 42 and into which the lighting device or bulb 41 extends. For each cell carried by the reading head there is alined corresponding bulb carried by the illuminating head. The housing 75 mounted on an arm 76 which in turn is mounted on a frame member 77 which is substantially coextensive with the length of the control drum of the apparatus. The illuminating head also includes a socket-supporting member or bar 79 on which sockets 80 for the light bulbs 41 are mounted. The sockets are supported by means of one or more brackets 81 on the socket-supporting member 79 and connectors 82 and 83 connect with each of the sockets 80 so that when the machine is in use current is supplied to each of these connectors so that all of the light bulbs 41 will be illuminated.

Figure 12:
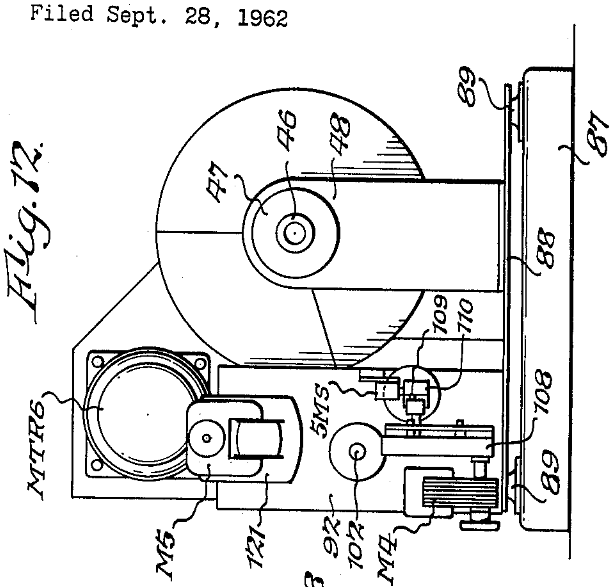
FIG. 12 is a left elevation view of the programmer of FIG. 11.
Figure 11:
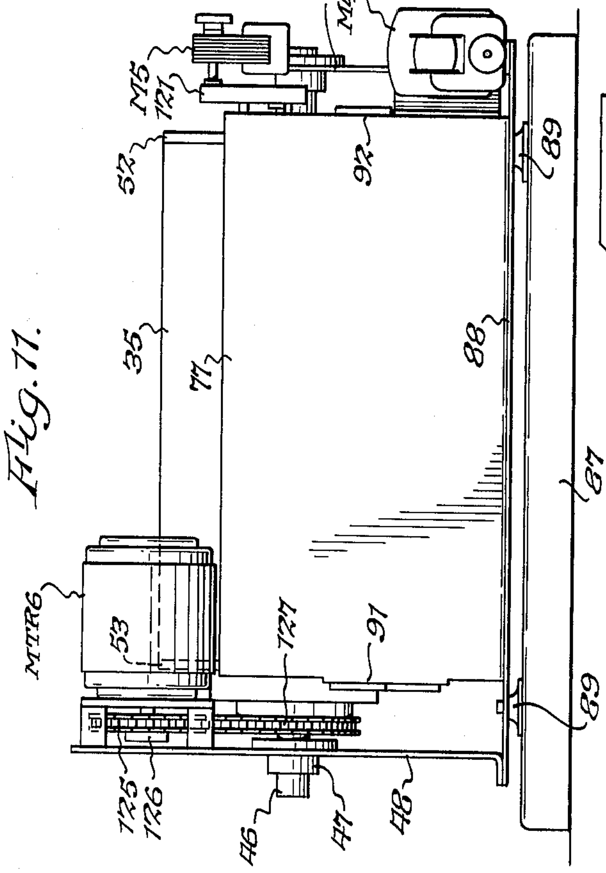
FIG. 11 is a front elevation of a portion of a programmer made in accordance with this invention.

The control drum itself is suitably mounted to rotate about a central, hollow shaft 46 through which conductors (not shown) leading from the photoconductive cells may pass to the exterior of the control drum assembly. This central shaft, as illustrated in FIGS. 11 and 12, is provided at opposite ends thereof with bushings 47 which rigidly mount the central hollow shaft on end supports or standards 48 of a housing in which the control drum is mounted, for example, by means of bolts 49, FIG. 15. The bushings themselves are secured to the hollow shaft by means of a set screw 50. The control drum has end walls or heads 52 and 53 which are rotatably mounted by ball bearings 55 on the hollow shaft 46 to permit ease and positive rotation thereof.

The various parts of the apparatus may be mounted in correct relation to each other by any suitable frame structure. As shown in FIGS. 11 and 12, the apparatus is mounted on a suitable support 87 on which a base plate 88 is supported by means of resilient or cushion mounting 89. This base plate has upwardly extending standards or supports 48 to which the bushings 47, secured to the hollow central shaft 46, are rigidly secured. An upright supporting frame member 77 is secured to and extends upwardly from the base plate 88 and has sides or wings 91 and 92 which extend beyond the opposite ends of the control drum and support parts of the apparatus which are arranged on the exterior of the drum.

Commands are entered on the control drum by selectively opening shutters 38, or as the case may be, closing them. The opening of the shutters and thereby uncovering the openings is effected by means of solenoids 96, illustrated in FIG. 16. These solenoids are arranged side by side, one solenoid being provided for each of the shutters in a row so that in the particular construction herein given by way of example, there will be twenty-four solenoids. Each solenoid has a plunger or armature 97. The portions of these plungers which enter into the solenoids are made of steel and the outer ends are made of brass or other non-magnetic material. The plungers extend through holes in a stop plate 98 and are provided with shoulders 99 which engage the stop plate 98 to limit the extent to which a plunger may travel upwardly when its solenoid is energized. When the solenoid is de-energized, the plungers drop by gravity back into the solenoids.

Figure 15:
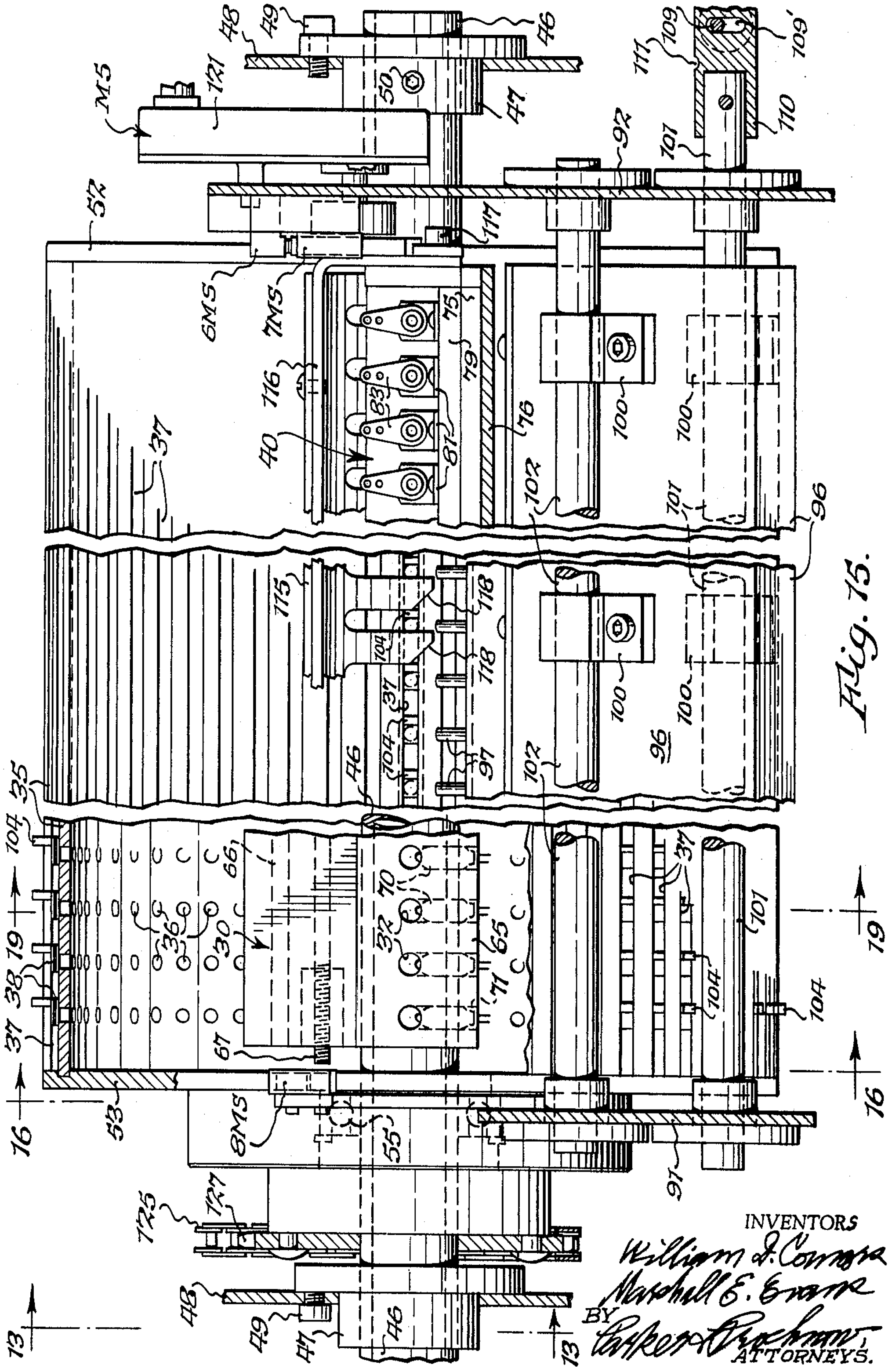
FIG. 15 is a front elevation on an enlarged scale of the memory drum partially broken away and showing some of its associated mechanism.

The solenoids 96 are grouped together to form a command entering bar having brackets 100 which are mounted on two rods 101 and 102, the rod 101 being slidably mounted in the end supports or wings 91 and 92 while the rod 102 is fixed in these end supports (also see FIG. 15). The command is entered by moving the rod 101 through its fixed brackets 100 and the solenoids mounted thereon lengthwise of the rods. Only those solenoids whose plungers are in upper positions and which are consequently arranged at a side of a shutter extension 104 will move into engagement with a shutter extension during the endwise movement of the command-entering bar. In the use of the apparatus, one or more of the solenoids 96 may be energized, thus moving their plungers upwardly so that the ends 97 thereof are at a side of the shutter extension 104. Consequently, when the command-entering bar is moved lengthwise with the rod 101, the shutter extension which is in operative relation to a plunger, will be moved into open position to admit light from the light head to the uncovered hole in the control drum open in this manner, and this light will act on the opposed corresponding photoconductive cells 31.

The movement of the rod 101 to impart motion to the solenoid is, in the construction shown, effected by means of a motor M4, FIG. 12, which has a gear drive 108 in which the driven shaft is provided with a crank pin 109 operating in a transverse slot 109′ in a bushing or crank head 110 secured to the rod or shaft 101. The bushing 110 is provided with a notch 111 on its upper surface into which a roller mounted on a switch arm 112 of the switch 5MS may enter for controlling the operation of the motor M4 which will be hereinafter described. After the desired number of shutters have been opened, the control drum is turned to present another row of shutters thereon to the command-entering mechanism.

Before a set of commands is entered on the mechanism, any shutters which have previously been opened, must be closed. The means for closing such shutters includes a series of clearing fingers 115 which are formed on a piece of sheet material of approximately quarter circular form. There are notches or spaces between each pair of fingers into which the extensions 104 of the shutters may enter when the fingers are in the positions shown in full lines in FIG. 16, and when the control drum is turned as indicated by the arrow in FIG. 16. Each of the fingers is provided at one side thereof with an inclined or cam portion 118. These cam portions are so arranged that when an extension 104 of a shutter is in open position, such extension will engage the cam portion 118 during the rotation of the drum so that such shutter is moved into closing position.

Figures 16, 17, 18:
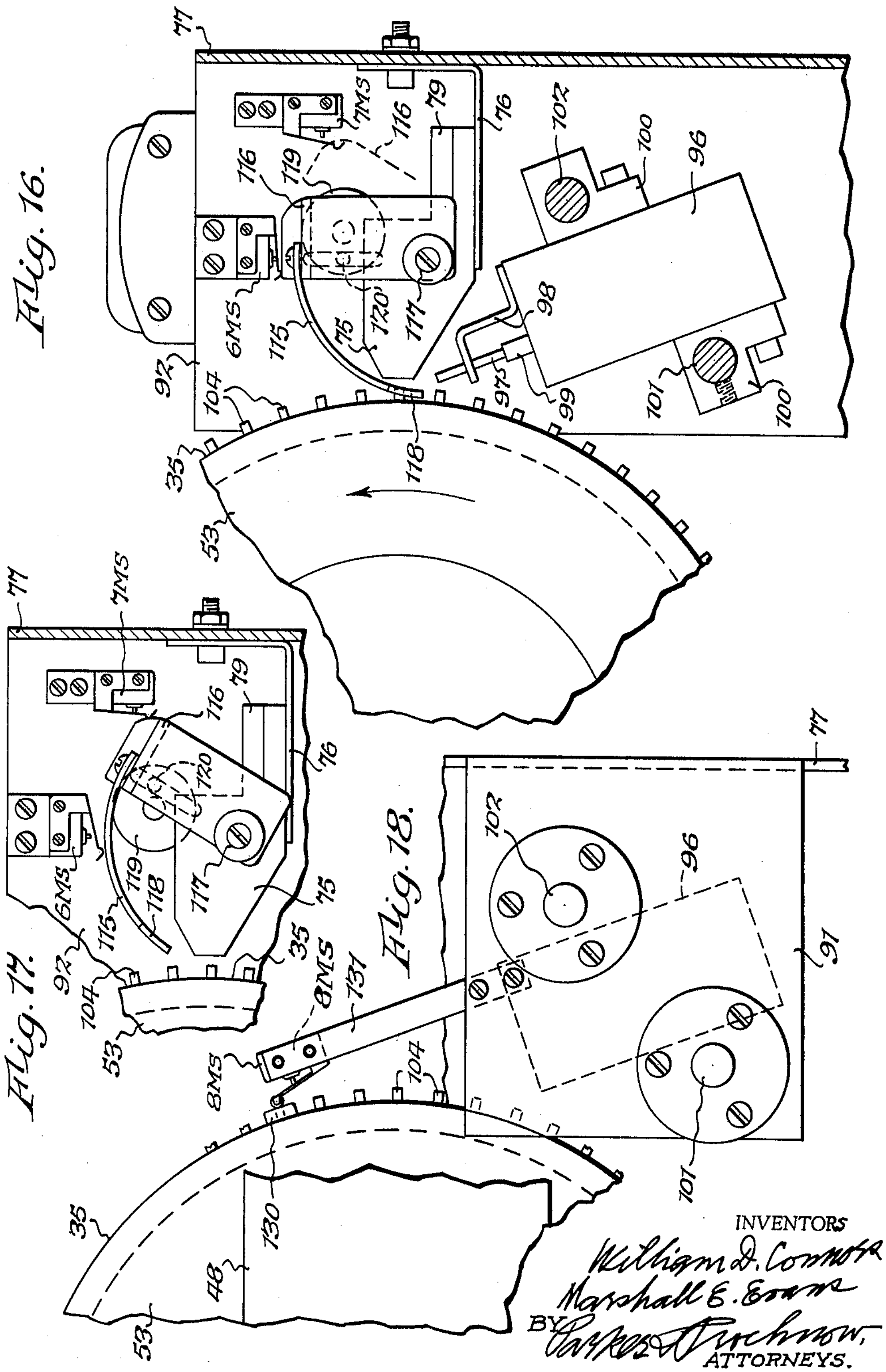
FIG. 16 is a fragmentary, vertical section approximately along line 16—16, FIG. 15, showing the clearing fingers and the command solenoids.
FIG. 17 is a similar fragmentary view with the clearing fingers in inoperative position.
FIG. 18 is another similar view showing the homing switch for the drum.

The shutter-closing or clearing fingers 115 are mounted on a clearing bar 116 which is movable from an inoperative or withdrawn position, as shown in FIG. 17, to an operative position as shown in FIG. 16. They move about pivots 117 mounted on the housing 75, by means of a disk 119 having a crank pin 120 which engages in a slot in the clearing bar 116. This crank pin is turned by means of a motor M5 through gearing contained in a gear box 121 and the clearing bar 116 closes a switch 6MS when in its clearing position and closes another switch 7MS when in its withdrawn or inoperative position. It will be understood that when the clearing fingers are in the position shown in full lines in FIG. 16 and the control drum is rotated in a counterclockwise direction through a complete revolution, any shutters which are in open positions will be returned into closed positions so that the control drum will then be ready to receive a set of commands.

Figure 13:
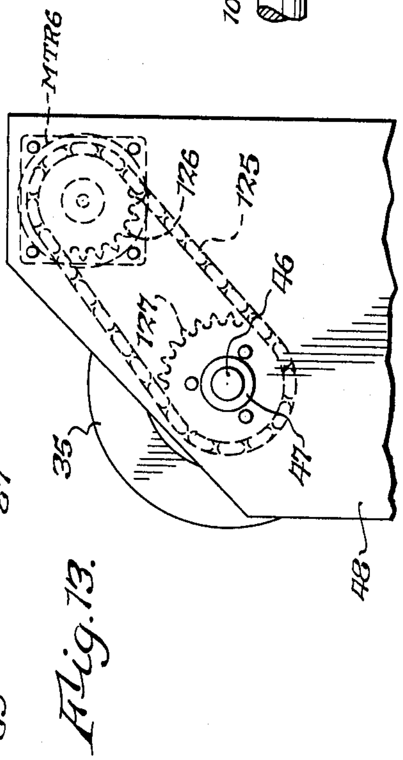
FIG. 13 is a portion of a cross section taken approximately along line 13—13, FIG. 15.

The rotation of the control drum either intermittently, that is step-wise from row to row or continuously through a complete revolution to clear the drum by moving all shutters into closed positions, is effectuated by a motor MTR6 (see FIG. 13) which is connected by a sprocket chain 125 with the control drum to turn the same about its hollow fixed shaft 46. This chain meshes with a sprocket wheel 126 on the motor shaft and a sprocket wheel 127 mounted on a side of the control drum.

This motor MTR6 is of the type which rotates the drum or moves it in steps, depending on whether A.C. or D.C. pulses are applied to it.

After the control drum has been rotated through a complete revolution and is returned to its starting or homing poistion, a projection 130 on the side of the drum, see FIGS. 16 and 18, activates microswitch 8MS so as to stop rotation of the control drum through the circuitry, hereinafter explained. This switch is mounted on an arm 131 having its lower end secured on a fixed frame part at a side of the control drum.

*Circuitry*

Figure 4:
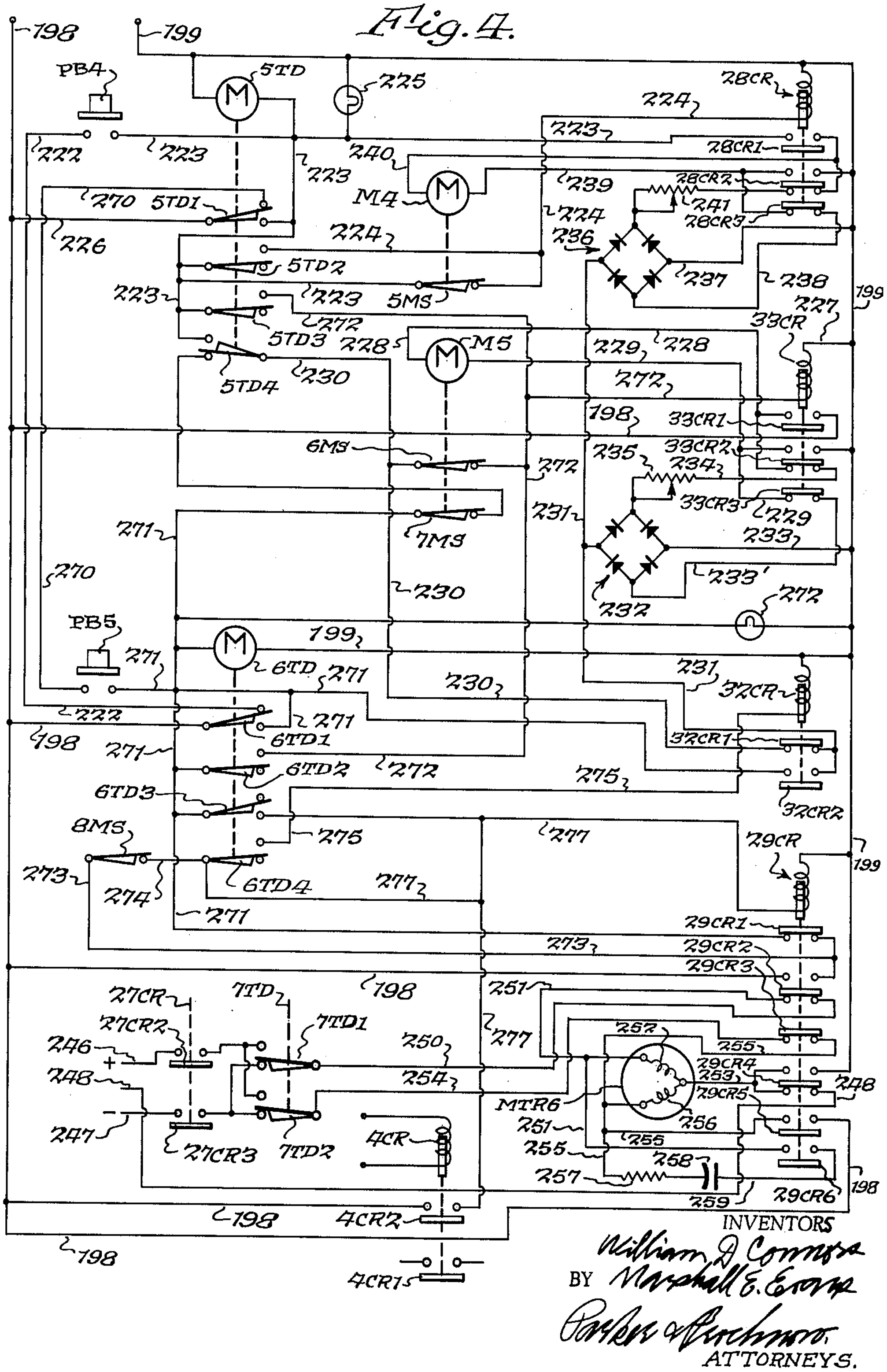
FIG. 4 is a circuit diagram of a portion of the electrical controls and components embodied in the programmer mechanism of this invention.
Figure 5:
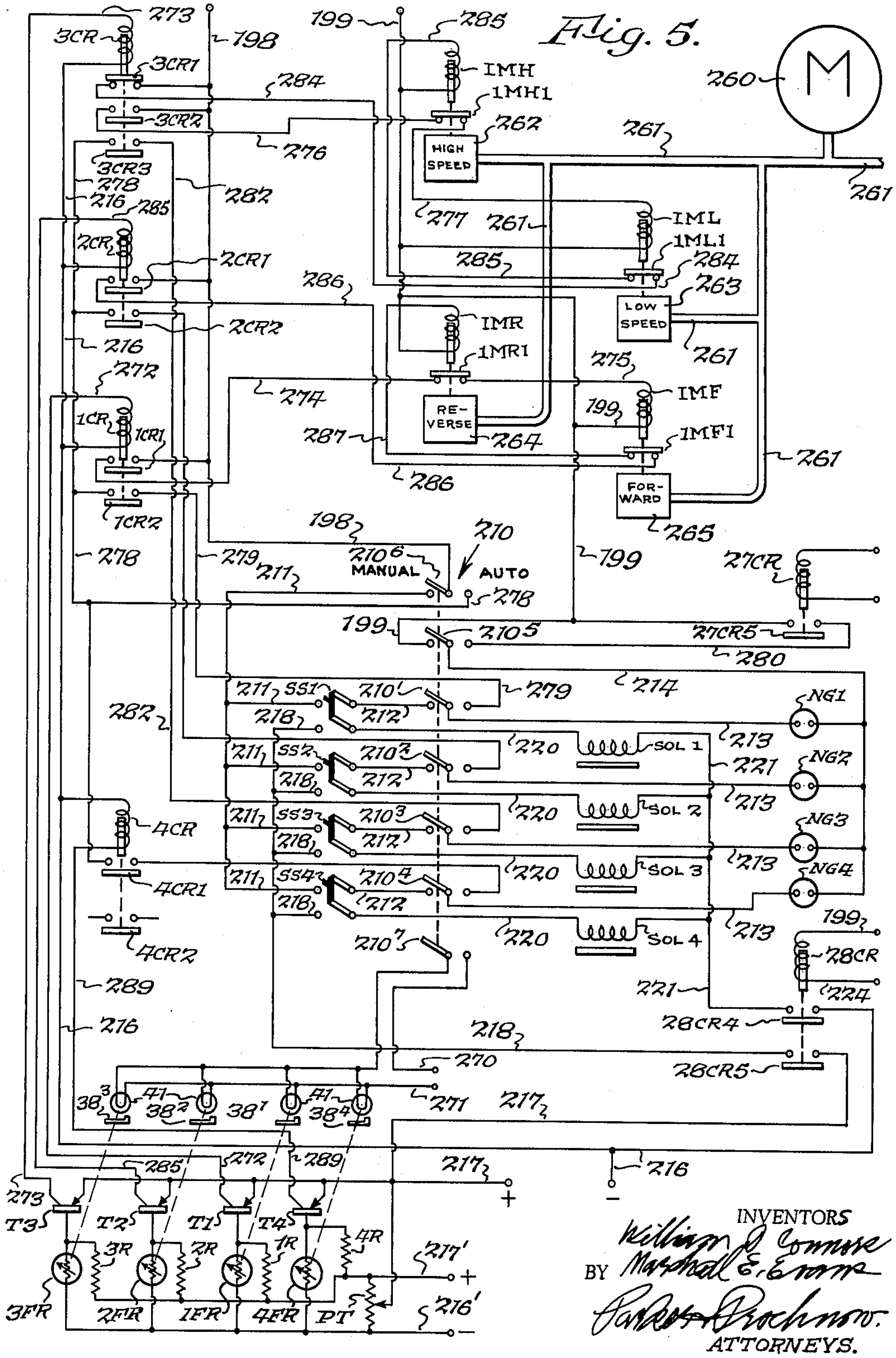
FIG. 5 is another portion of the circuit diagram of other electrical controls and their connections to a motor under control of the programmer mechanism.

The wiring diagrams of FIGS. 4 and 5 have been reduced in complexity by limiting this description to four responses or command circuits, this being sufficient to demonstrate and illustrate how the invention works, since any further commands would be mere duplications. As has been mentioned thereinbefore, the control drum shown has sixty rows, each row having twenty-four light valves, thus giving the drum the capability of a total of over one thousand commands which represents the memory capacity of the particular drum shown. Of course, this large number of commands are broken down to 24 commands at one time with successive and consecutive rows taking over command at spaced intervals.

As has been previously described, the photoconductive cells 31 are indicated in the circuit of FIG. 5 and designated as 1FR, 2FR, 3FR and 4FR and are mounted inside of the drum 35 while the light bulbs 41 are mounted on the bracket 40 outside of the drum. We will assume that all of the black plastic shutters 38 being positioned on their slots 37 are in light-blocking positions so that the light-sensitive resistors or photoconductive cells 31 cannot receive light from their light bulbs 41. We will also assume that the control drum 35 is in its home or start position.

As mentioned above for simplicity we have limited this description to four responses or command circuits and have chosen for example the main spindle motor of a machine tool indicated in FIG. 5 as 260. It will be under the control of a high speed controller 262, low speed 263, reverse 264 and forward 265 controller which are actuated by their relays 1MH, 1ML, 1MR and 1MF.

For manual control of this motor 260 the Manual-Auto switch 210 would be set to the manual position. This switch 210 comprises ganged contractors 210′, $\mathbf{210^2}$, $\mathbf{210^3}$, $\mathbf{210^4}$, $\mathbf{210^5}$, $\mathbf{210^6}$ and $\mathbf{210^7}$. The selector switches SS1 will represent FORWARD rotation SS2 REVERSE and SS3 LOW SPEED. Current is supplied from the terminal or supply lines 198 and 199, and can now flow from the line 198 through the manual switch $\mathbf{210^6}$, line 211 to the upper contact of each of the selector switches, SS1, SS2, SS3 and SS4. These selector switches are single throw, double pole contact switches and as mentioned identify a certain function or command. For example, if it is desired that the motor 260 is to be run forward at full speed, the switch SS1 would be closed. Current will then flow from the line 211 upper contact of switch SS1 to line 212, now closed switch 210′, line 213, neon lamp NG1, line 214, switch $\mathbf{210^5}$ to the other side of the line 199, thus causing the neon lamp NG1 to glow. This glowing of NG1 illuminates the photoconductive resistor 1FR which is located in its mounting hole 32, intersected by the mounting hole 71, see FIGS. 19 and 20. Upon illumination the resistance of 1FR is lowered causing its transistor T1 to pass current from the line 217 to the line 272. This being more fully explained later.

Current in the line 272 flows to the winding of relay 1CR then to the other side of the line 216, thus energizing this relay 1CR. Contactor 1CR1 is then closed permitting current to flow from line 198 across contactor 1CR1 to line 274, closed contactor 1MR1, line 275, coil of relay 1MF and to the other side of the line 199, thus energizing this relay 1MF which also opens its contactor 1MF1 and actuates the FORWARD contactors in the control box 265. The spindle motor 260 will now run in a forward direction at high speed.

Similarly with the switch 210 in the manual position, closing of the low speed switch SS3 through its neon lamp NG3, photoconductive resistor 3FR, now energized relay 3CR, now closed contactor 3CR2 and now energized relay 1ML through contactors in the low speed control box 263, will cause the motor 260 to run in low speed.

If reverse is desired, closure of the switch SS2 will similarly in manual position cause the contactors in the reverse control box 264 to run the motor 260 in reverse.

Manual operation of the motor 260 as just explained is necessary and useful when setting up tools in the machine under control of this apparatus previous to setting up the final program for automatic operation. Especially is this so when setting up an enlarged version of the programmer as illustrated in the chucking machine in FIG. 22 and later explained, wherein a carriage, cross slide and turret tool holder are used.

When in manual these SS function switches may be operated in any order desired by the operator, which may or may not be in the order to be set up finally in an automatic programmed sequence.

To enter commands to be memorized by the programmer, the switch 210 is set to its AUTOMATIC position, whereupon all of its contactors 210′–$\mathbf{210^7}$ will be thrown to the right in FIG. 5.

As previously mentioned the SS switches have double poles an dif let us say the selector switch SS3 for low speed is closed, current will then flow in another circuit when switch 210 is in automatic position.

Direct current is provided to this circuit through the D.C. supply terminals 216 and 217 and current will flow from 217 to the contacts of a contactor 28CR5 of a solenoid 28CR. As will shortly be explained, when this contactor 28CR5 is closed, current will flow to the line 218, lower contact SS3 to line 220, SOL3, line 221, contacts of contactor 28CR4 when closed and to line 216, thus energizing the solenoid SOL3 to place its armature finger in the path of its shutter. Similarly let us close the switch SS1 and have its armature finger SOL1 project into the path of its shutter 38.

Since this is a limited description and illustration, only two selector switches have been described as closed, while if all of the twenty-four used were described, possibly several more would be used and closed for other functions.

We have thus set up the preliminary of the enter command by activating the switches SS3 and SS1 to cause the respective shutters to be closed. As seen in FIG. 4, the enter comamnd button PB4 is pushed after the switch 210 is operated, closing its contacts which will provide current from line 198 across the upper contacts of now closed timer cam switch 6TD1 (normally open), line 222, now closed contacts of command button PB4 to line 223, to the timer motor 5TD and then to the other side of the line 199, thereby starting the motor through its cycle. This closing also causes the signal lamp 225 to be energized and be illuminated to indicate that the controller circuit is in enter command operation. After the shaft of timer 5TD rotates 30 degrees, its cam switch 5TD1 will close and provide a holding circuit to the timer 5TD through the lines 198, 226, lower contact of switch 5TD1, line 223, motor 5TD to the other side of the line 199, thus keeping it energized as well as the indicator lamp 225. At the same time, as will be seen by observation of the timing chart shown in FIG. 2, another cam switch 5TD3 of the motor 5TD, will be closed as indicated in the thirty degree column and the X in its circle. The open circles thereof indicate open switches. Since this motor 5TD is continuously rotating the closing of 5TD3 is a momentary action and it energized the relay 33CR through the following connections: Current from line 223 flows across the upper contact of 5TD3, to line 272, to solenoid 33CR and to the other side of line 199.

Relay 33CR will now be in holding condition through a closed microswitch 6MS of a shutter closing motor M5, cam switch 5TD4 which is now contacting its upper contact connected with the line 223, through 6MS, line 272, relay 33CR and to line 199, thus providing current to relay 33CR. Energization of M5 will now take place since upon energization of relay 33CR its contactors 33CR1 and 33CR2 are closed. Current flows from line 198 through contactor 33CR1 to line 228, motor M5, line 229, contactor 33CR2 to the other side of the line 199, thus energizing M5.

Motor M5 actuates the clearing bar 116 down into position for clearing i.e. to move all of the shutters 38 into closed position. This is done before entering each set of commands in a row of shutters to ensure that no shutter is left open that a new set of commands does not call for. When the clearing bar 116 has reached its down or its 180 degree clearing position, a switch 7MS is opened, but since its circuit is open at 5TD4, it has no effect at this time. The switch 6MS then opens when the clearing bar 116 returns 180 degrees back to home position, or its non-clearing, up position. This switch 6MS which formed part of the holding circuit for the relay 33CR now no longer holds the relay energized and it drops out, deenergizing the motor M5 and stopping its rotation. The contacts 33CR2 and 33CR3 now of relay 33CR now close to brake the motor M5 by supplying it with direct current in the following manner. Alternating curernt from line 223, cam switch 5TD4 contacting its upper contact, line 230 closed contactor 32CR1, line 231 bridge rectifier 232, line 233 to the other side of the line 199, thus energizing the rectifier. Direct current from rectifier in line 233′ flows through contactor 33CR3 to line 229, motor M5, line 228, contactor 33CR2 and line 234, variable resistance 235 to the other side of the rectifier 232, thus supplying direct current and stopping the motor M5.

Figures 1, 2, 3:
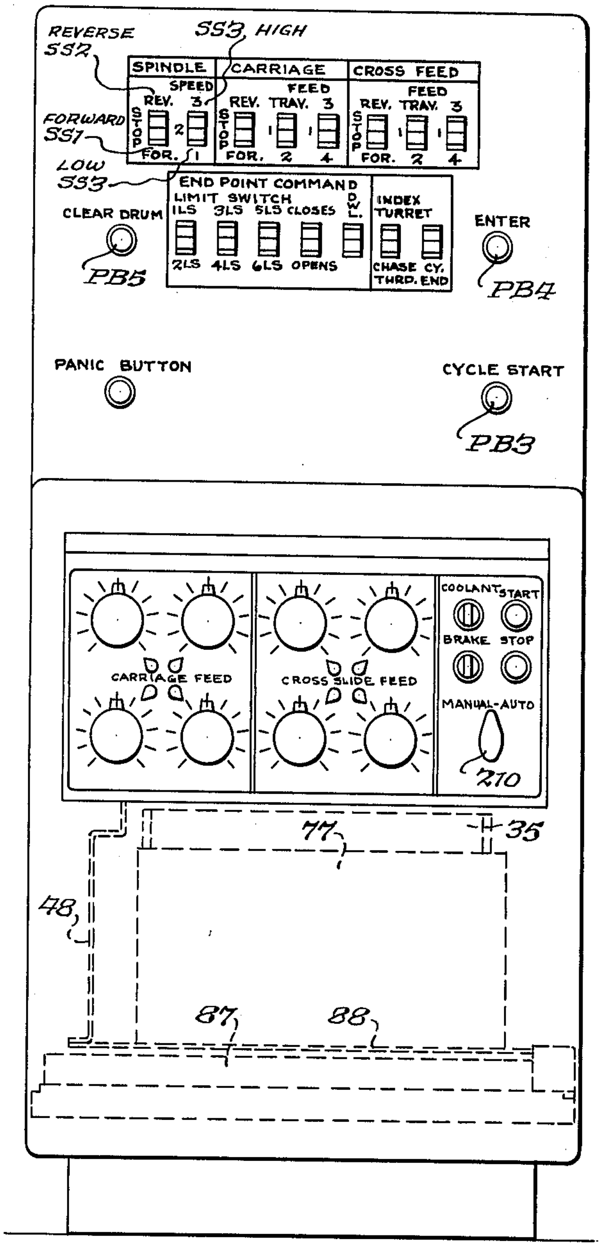
FIG. 1 is a front elevation of a control console embodying our invention and showing the various controls and switches, and housing the programmer mechanism.
FIG. 2 is a development chart of one of the timers indicating the various switches actuated by its cams and the degrees of rotation at which they are opened and closed.
FIG. 3 is a similar view of another one of the timers used in the invention.

While the aforementioned actions have been taking place, the motor 5TD has advanced to the 90 degree position of the chart in FIG. 2 at which time the cam switch 5TD2 momentarily closes. Current now flows from the line 223 through the now closed cam switch, the upper contact of 5TD2 line 224, relay solenoid 28CR to the other side of the line 199, thus energizing it and closing the two previously mentioned contactors 28CR4 and 28CR5 shown in FIG. 5, providing direct current as already explained for the solenoid SOL1 and solenoid SOL3, extending their armature fingers into the path of their shutters.

Figure 14:
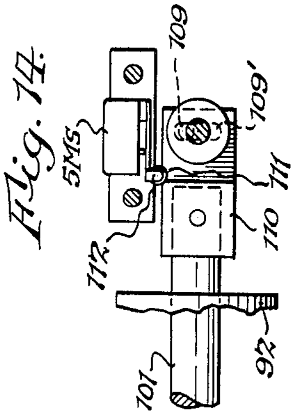
FIG. 14 is an enlarged detail plan of the crank for driving the command mechanism.

Energization of relay 28CR also starts the command-entering motor M4 which drives the crank pin 109 in the slot 109′ attached to the guide rod 101, which in turn drives the solenoids 96, designated in the circuit diagrams as SOL1, SOL2, SOL3 and SOL4, see FIGURES 11, 12 and 14. As the crank pin 109 gives the rod and the solenoids a rectilinear motion, whatever solenoids (in this case solenoids SOL1 and SOL3) are energized so as to have their armatures projecting into the path of their shutters 38, the shutters are moved into their uncovered or open positions, thus giving that open shutter and its associated light and photoconductive cells the capability of being programmed. As mentioned before, if more than one command is entered on that row, more than one solenoid would open a shutter at one time. The crank head 110 has a notch 111 on its upper surface to receive a roller of a switch 5MS. When the motor M4 has completed its revolution to open the shutters as just explained, the switch 5MS, which was holding the circuit to the relay 28CR, since the switch 5TD2 is only momentarily closed to energize relay 28CR, will now open as its roller enters the notch and relay 28CR will be deenergized. Also, through relay 28CR, motor M4 will be deenergized of A.C. current and the now closed contactor 28CR2 and 28CR3 will apply direct current to motor M4 to brake it. A.C. current from the line 231 flows to the bridge rectifier 236 and then by line 237 to the other side of line 199. Direct current then flows from line 238 through contactor 28CR3, line 239, motor M4, line 240, contactor 28CR2 to variable resistor 241 back to the rectifier 236, thus stopping the motor M4.

Timer 5TD by this time has progressed to the 180 degree position so that its cam switches 5TD1 and 5TD4 have returned to normal and they are now open with switch 5TD1 now shutting off its motor 5TD. In other words, for the first half revolution of the timer 5TD, the command was entered, while on the rest of the rotation 5TD1 opens to stop the motor at its starting position.

Summarizing the essential operation up to this point:

First, the switch 210 is placed in "Automatic" operation and the necessary or desired SS switches are thrown. This action accomplishes energization of shutter opening solenoids corresponding to the throw switches. Then the enter command button PB4 is closed, activating timer motor 5TD. As this motor rotates, it opens and closes various sequential timer switches by a camming action which through their contacts clear or close all of the shutters of one row and then cause the energized solenoids to open the shutters that correspond to the thrown switches by the operation of another motor. Continued rotation of the timer motor returns the timer switches to their normal positions.

One row of commands has now been entered and by indexing the drum to the next row and repeating the procedure, subsequent rows may be entered.

The drum rotating motor MTR6 is capable of continuously rotating or intermittently stepping the drum 35. It is the type of synchronous motor sold to the trade under the trade mark "SLO-SYN" and manufactured by Superior Electric Company of Bristol, Conn.

This motor when connected to 60 cycle A.C. current runs at a low synchronous speed of 72 r.p.m. When connected to a proper pulsing D.C. power source which has a suitable switching arrangement, the motor can be made to step in precise increments.

Figure 10:
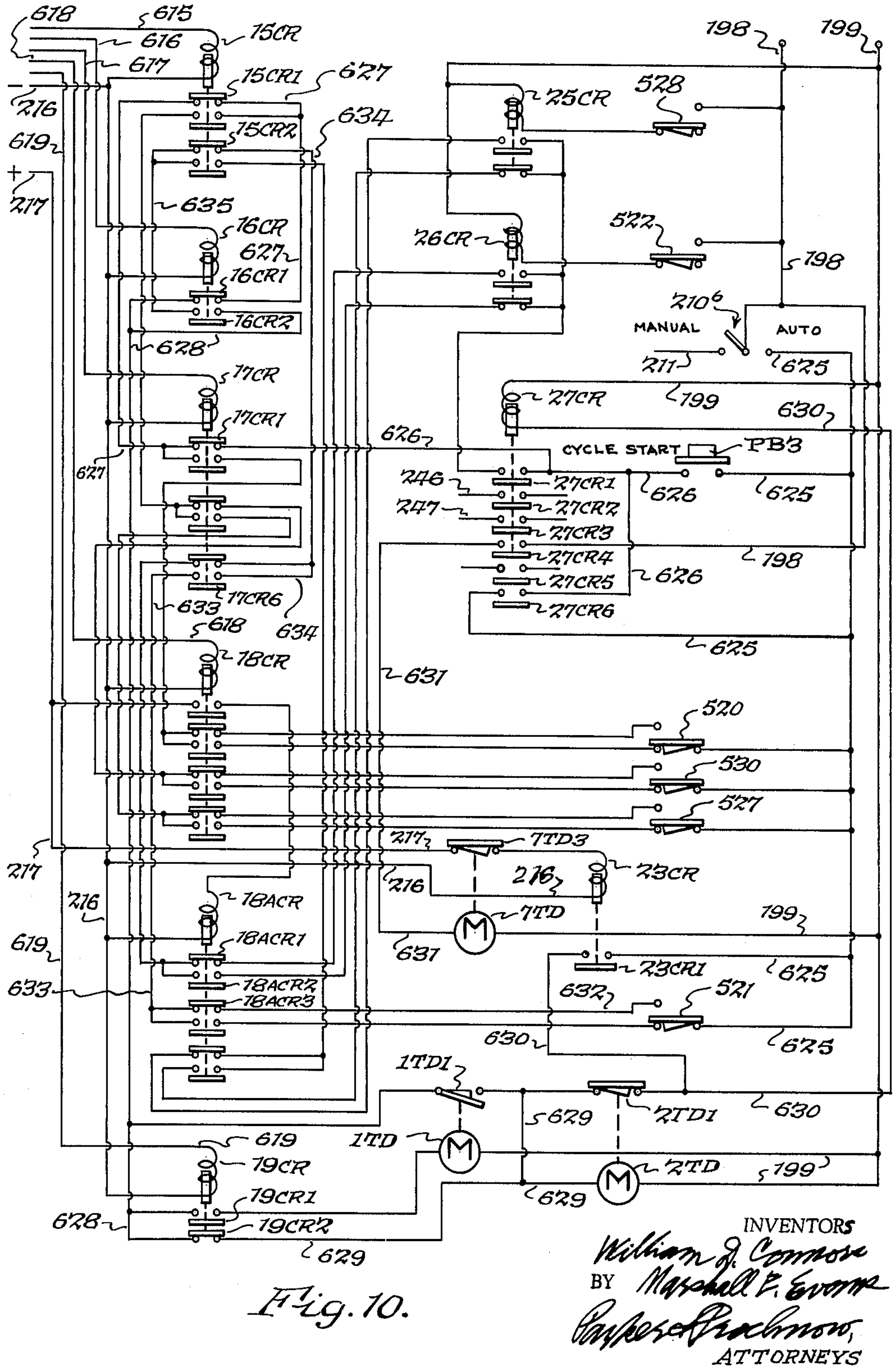

A pulse sequencing motor 7TD shown in FIG. 10 as having cam driven switches 7TD1, 7TD2 and 7TD3 is provided for stepping the motor MTR6 causing it to rotate the drum 35 sequentially from one row of shutters to the succeeding row. The switches 7TD1 and 7TD2 are also shown in the circuit of FIG. 4. The positive terminal is connected to line 246 and the negative terminal to line 247, while a common or neutral terminal line 248, which would be connected to the center top of the transformer (not shown) supplying current to a full wave rectifier feeding the lines 246 and 247. This transformer and rectifier are not shown since this is common practice and well known in the art. The terminal lines 246 and 247 have contactors 27CR2 and 27CR3 actuated by a time delay relay 27CR shown in FIG. 10. Time delay relay 27CR will only be energized for the length of time necessary for the proper number of pulses required to step the drum from one row to the next.

When these contactors 27CR2 and 27CR3 are closed, current will flow from line 246, contactor 27CR2 to the upper contacts of 7TD1 and 7TD2 to the lines 250 and 254 closed contactors 29CR2, 29CR3, lines 251 and 255 to the winding 252 and winding 256, line 253, contactor 29CR4 and back to the common line 248 supplying the windings 252 and 256 with negative voltage. The switch 7TD2 next raises to its upper position while 7TD1 momentarily stays down. 7TD1 then is raised to its upper position while 7TD2 momentarily stays up. 7TD2 is then lowered for the following step and for the next step 7TD1 is lowered, returning the switches to the position shown in FIG. 4. This sequence will be repeated for any further steps of the motor MTR6 and the reversing of polarity will step the motor MTR6 one increment of rotation for each pulse while holding or locking it between pulses. This pulsing or stepping can only take place while the relay 29CR is deenergized and its contactors 29CR2 and 29CR3 are in closed position.

When the relay 29CR is energized its contacts 29CR2 and 29CR3 will open and the motor MTR6 will not be connected to the pulse sequencing motor switches 7TD1 and 7TD2 and therefore cannot be stepped. Under this condition, however, the contactors 29CR4, 29CR5 and 29CR6 will contact their upper contacts and alternating current can be supplied to the motor MTR6 to run it continuously for clearing as will now be explained.

Alternating current from the line 198 flows across the now closed contactor 29CR5 to the line 255, motor coil 256, line 253, contactor 29CR4 at upper contacts and to the other side of the line 109. Alternating current also flows from the line 255, resistance 257, condenser 258, line 259, closed contactors 29CR6 to the line 251, motor coil 252, line 253, contactor 29CR4 on upper contacts to the other side of line 199. Thus the motor MTR6 runs continuously and synchronously on the 60 cycle alternating current supply.

We have to this point entered two commands into one row of shutters on the control drum so let us assume for example, that these commands are to operate the main spindle motor 260 of a machine tool, such as a turret lathe. This spindle motor is shown in FIG. 5 and has conduits 261 which supply it with power of proper voltage and which connect it with control boxes 262, 263, 264 and 265. These being the high speed controller 262, low speed 263, reverse 264 and forward 265 controller and are actuated by the relays 1MH, 1ML, 1MR and 1MF which are connected into the circuit of the programmer. These relays 1MH, 1ML, 1MR and 1MF are in turn actuated and under the control of three relays 1CR, 2CR and 3CR. The relay 4CR shown is used for finishing the cycle of the programmer.

In FIG. 5 the circuitry is such that when 1CR is energized, the motor runs in forward speed, and when 2CR is energized, it runs in reverse. Also, when 3CR is energized the motor runs in low and when 3CR is deenergized, it runs at high speed.

Let us assume that the first commands that we have entered are to operate the motor 260 in forward low speed and that next we will want to run it in high and finally in reverse and then stop it. Since SS3 has been entered as previously explained and will command the motor 260 to run in low speed and SS1 has been entered to command the motor 260 to run in forward thus giving us the first command. We will in the next row leave the switch SS3 in open position for high speed and close the SS1 switch for the forward direction, and then push the enter command button PB4 closing its contacts which will set into operation the stepping of the drum by its motor MTR6 to the next row of shutters and start the cycle previously explained to enter this new high speed command. Next the switch SS2 is closed to enter a reverse command and PB4 is closed to enter it. Finally the cycle end switch SS4 is closed to bring the cycle to an end and home the drum for automatic operation. The following are the positions of the four shutters of the first four drum rows:

| Command | 38′ | $38^2$ | $38^3$ | $38^4$ |
|---|---|---|---|---|
| Fwd. low speed | Open | -------- | Open | |
| Fwd. high speed | Open | -------- | -------- | |
| Reverse | -------- | Open | -------- | |
| Stop and home | -------- | -------- | -------- | Open. |

Assuming now that the drum 35 is in home position and we set the switch 210 to automatic position, all of the switches 210′, $210^2$, $210^3$, $210^4$, $210^5$, $210^6$ and $210^7$ will be thrown to connect to their right hand contacts as shown in FIG. 5. Current is supplied through the lines 270 and 271 and now closed switch $210^7$ with the light bulbs 41 illuminated. Since the motor 260 is to first be operated in forward low speed and we have already entered these commands into the drum 35 by shifting the proper shutters 38 into open position so that when this row is in position, light will pass through the opened shutters and activate the photoconductive cells 1FR and 3FR.

Connected in a series loop with each of the photoconductive cells is a standard type resistor (1R, 2R, 3R and 4R) and a D.C. voltage source (terminals 217′; 216′). The base electrode of the transistor is joined to the junction of the photoconductive resistor FR and the resistor R. When the photoconductive cell is a high resistance element (not illuminated) no current will flow in this series loop and, therefore, the base of the transistor will be at approximately the same positive potential as terminal 217′. Since the emitter electrode is at some positive potential below this, as is evident from the fact that it is connected to the movable tap of potentiometer PT while the upper end is tied to terminal 217′, the transistor will be in its non-conducting state. When, however, the photoconductive cell is illuminated, its resistance is appreciably reduced. Current will then flow in the series loop and the drop produced thereby across the resistor R will reduce the potential at the base electrode so that conduction between emitter and collector will occur. The photoconductive cell acts much the same as a switch. A second series loop exists and includes another power supply (not shown) represented by terminals 217 and 216, emitter and collector of the transistor and the relay coils CR. When the transistor conducts and current flows in this second loop the relay is energized which, in turn, controls the activation and operation of another device, as in this case the spindle motor 260. Since the current required to activate the relays CR is somewhat higher than that which can be passed through the photoconductive cells, the intermediate transistor stage is employed, in addition to the fact that by proper biasing thereof the response time and reliability of the controller can be maintained at the proper limits.

In our case with the illumination of 1FR and 3FR their respective transistors T1 and T3 conduct to pass current to the forward relay 1CR and the high-low relay 3CR. The relay 3CR when energized is in low speed position. Current to the relay 1CR passes from line 217 to the transistor T1, emitter to its collector to the line 272, relay winding 1CR and back to the negative side of the line 216. Current to relay 3CR passes from line 217 to the transistor T3 emitter to its collector to the line 273, relay winding 3CR and back to the negative side of the line 216. Relay 1CR now being energized will have its contactors 1CR1 and 1CR2 closed. Current will flow from line 198, contactor 1CR1, line 274, closed contactor 1MR1, line 275, coil of forward power relay 1MF to the other side of the line 199 energizing it and through contactors in its control box 265 provide current to the spindle motor 260 to run it in forward direction.

Current will also flow from line 198, contactor 3CR2 of high-low relay 3CR, to line 276, contactor 1MH1, line 277, coil of low power relay 1ML to the other side of line 199 energizing it and through its contactors in its control box 263 provide current to motor 260 to run it at low speed.

With the spindle motor 260 now running in low, forward speed and doing its work, if we assume that upon completion of this work the drum motor MTR6 is activated by a signal to step the drum 35 to the next row of commands, we will find that our next command is for the spindle motor 260 to run at high speed.

It should be realized that as the control drum is stepped from one row to the succeeding row the light from the bulbs 41 of the illuminating head is blocked by the body of the control drum 35 even though the shutters may be open. This, in effect, is equivalent to deenergizing all the relays while the drum is stepped, and causes undesirable intermittent operation of the relays. In order to overcome this problem, a means for maintaining continuous operation and control during indexing is provided and in the illustrated embodiment it comprises the illumination supplied by holding lamps NG1–NG4.

The aforementioned time delay relay 27CR which provides current through its contactors 27CR2 and 27CR3, FIG. 4, to step the motor MTR6, also has a contactor 27CR5, FIG. 5, which provides current to energize the neon holding lamps NG1–NG4 only during indexing from one row to the other. Current from the line 198, switch $210^6$ in auto position, line 278, contactor 1CR2, line 279, switch 210′, line 213, NG1, line 214, switch $210^5$, line 280 now closed contactor 27CR5 to the other side of line 199, thus illuminating NG1. Also current flows from line 198 to switch $210^6$, line 278, contactor 3CR3, line 282, switch $210^3$ line 213, NG3, line 214, switch $210^5$, line 280, closed contactor 27CR5 to the line 199, energizing NG3. During the stepping to this next position of the drum the neon lamps NG1 and NG3 through their illumination have kept the photoconductive cells 1FR and 3FR activating their transistors T1 and T3 even though the light openings of those open shutters 38 are no longer in the path of light from the lamps 41. Therefore the relays 1CR and 3CR and their power relays 1MF and 1ML have kept the spindle motor running in forward low speed. Relay 27CR is activated with the start of the step and before the CR relays become deenergized and so these CR relays cannot drop out but are held through the action of the neon bulbs.

Now, however, the new command will take over. Since relay 27CR is only energized as long as the motor MTR6 is being stepped, then when the next row comes up and is indexed, it will be deenergized and drop out. Therefore, all activated neon bulbs will be extinguished.

In this new succeeding row the SS3 switch was left open so that its solenoid SOL3 will not be energized and therefore its shutter will be in light-barring or covering position, preventing light from its lamp 41 from activating the photoconductive cell. The SS1 switch was entered so its shutter 38′ is now open permitting light to activate the photoconductive cell 1FR, its transistor T1 thereby energizing its relay 1CR as has already been explained. Relay 3CR now is not energized so current flows from line 198, normally closed contactor 3CR1, line 284 to now closed contactor 1ML1, line 285, winding of power relay 1MH to the other side of line 199. 1MH is now energized and through its contactors in its control box 262 will run the spindle motor 260 at high forward speed.

Again when it has finished and a signal activates the drum to step to the next row, the stepping cycle just explained will be repeated and the next command, which is reverse, will come up.

The 2FR light resistor will now be activated by light from lamp 41 past its open shutter 38 and the following current flow will take place. Current from line 217 will be passed by transistor T2 into the line 285 to the winding of the relay 2CR and into the return line 216, thus energizing the relay 2CR. Then through its now closed contactor 2CR1 current will flow from line 198, contactor 2CR1, line 286 to the now deenergized and closed contactor 1MF1, line 287, winding of power relay 1MR and back to the other side line 199, thus energizing this power relay and putting the motor 260 in reverse rotation.

After the necessary duration of reverse rotation has taken place, again a signal activates the drum to step to the next row and the next command, which is Cycle End comes up.

Light past the open shutter 384 activates the light sensitive resistor 4FR, which activates transistor T4 to pass current from line 217 to line 289, the winding of relay 4CR to the other side of the line 216, energizing it. When relay 4CR is energized, momentarily, as will be seen in FIG. 4, its contactor 4CR2 will be closed causing the stepping motor MTR6 to be connected to A.C. current to home the drum 35 and return it and all circuits back to normal as will now be explained.

In FIG. 4, current from line 198 flows to the now closed contactor 4CR2 to the line 277, winding of relay 29CR to the other side line 199. With 29CR energized, the contactors of this relay form a holding circuit through the now closed home switch 8MS. As previously explained, alternating current will flow to the motor MTR6 through the contactors 29CR4, 29CR5, 29CR6 and cause it to rotate continually toward home position until it opens the home switch 8MS whereupon relay 29CR is deenergized and all parts and circuits are back to a normal condition ready for a repeat cycle.

In all the previous description, it was not stated as to when the next stepping is initiated. In other words, after the spindle motor is in its high forward speed, how is the drum signalled to proceed to the succeeding operation? Various forms of switches can be used for this purpose, such as a limit switch which is engaged by a moving part of the controlled machine at some point in its travel and through its contacts activate a relay of the controller. A timing switch would, where useful, also control the stepping of the control drum in accordance with some time-dependent pattern.

*Example of use*

Figure 22:
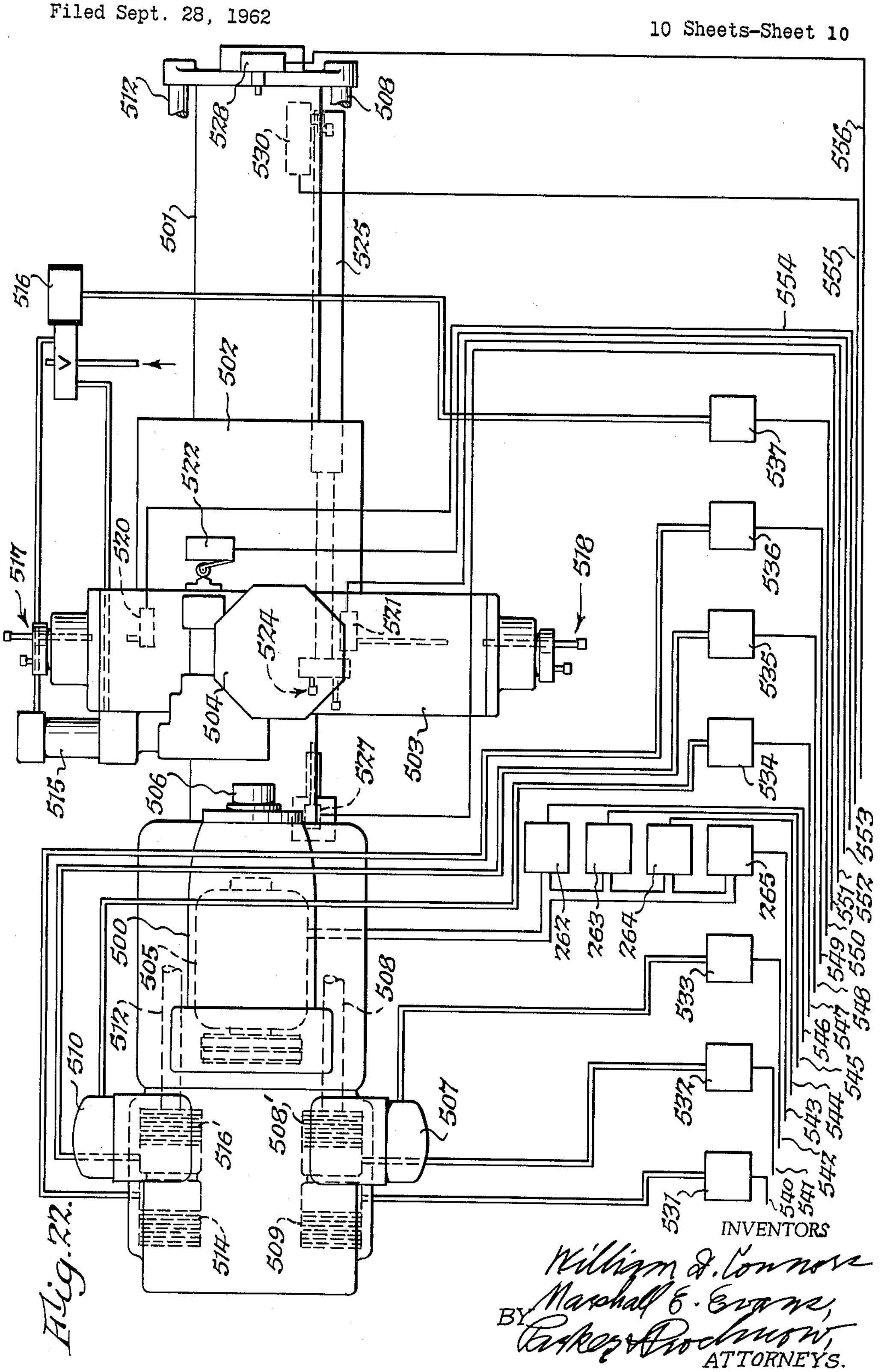
FIG. 22 is a block diagram of an automatic chucking machine such as can be controlled by the programmer of this invention.

The programed controller herein described may also be applied to operate a large number of apparatus and appliances, and in order that this invention may be clearly understood, we have now illustrated the same as applied, for example, to a lathe of the type commonly referred to as an automatic chucking machine and is shown in FIG. 22 diagrammatically in plan and comprises a headstock 500, a bed 501, a carriage 502 and a cross slide 503 carrying a turret tool holder 504. The spindle is diven by a motor 505 having the usual belt drive to the spindle 506 which may carry the usual chuck.

The carriage 502 is power driven by a motor 507 which drives a shaft 508 through an electric clutch system comprising a traverse clutch 508' and a feed clutch 509. Similarly the cross slide 503 is power driven by a motor 510 through a power takeoff shaft 512, having a similar electric clutch system comprising a traverse clutch 514 and feed clutch 516'.

The turret 504 is air actuated by a piston and cylinder 515 under control of an electric valve solenoid 516. Adjustable stops 517 and 518 in multiple are provided at either end of the cross slide as well as limit switches 520 and 521 and a cross slide center switch 522.

The carriage is also supplied with multiple front stops 524 rotatable on a traverse feed bar 525. Front stop switch 527 and a carriage return switch 528 are also provided. The carriage traverse feed bar may have different traverse cams in line with each of its stops 524 to provide different feed points through the traverse to feed switch 530.

Control boxes 262 high speed, 263 low speed 264 reverse and 265 forward are identical to those shown in the circuit diagram of FIG. 5 and operate as previously explained in conjunction with that figure for controlling the speed of the spindle motor 505. Similar control boxes are used for all of the functions and units to be controlled from the programmer. The carriage feed clutch unit 509 has a control box 531. The traverse clutch and brake unit 508' has a control box 532 and the drive motor 507 has a control box 533. The cross slide drive motor 510 has a control box 534. The cross slide feed clutch and brake 516' has a control box 535 and the traverse clutch and brake 514 has a control box 536. The turret control valve solenoid 516 also has a control box 537.

The clutches are provided to slip when either the carriage slide 502 or the cross slide 503 are brought up against their stops 524, 517, 518. The feed or traverse of the power takeoff shafts 508 or 512 may be reversed by reversing the motors 507, 510. The air cylinder 515 when activated indexes the turret 504 as well as indexing the carriage and cross slide stops 517, 518 and 524.

All of the stops may be provided with switch operators connected into the circuit so that they trip just before the solid stops engage such as the switches 520, 521, 527 and 528. The traverse to feed cam shaft 525 may have cams for each turret position and actuate the traverse to feed switch 530 to slow down the carriage at different predetermined points. The cross slide center switch 522 will signal when the slide is in its center position while the carriage return switch 528 will signal when the carriage is completely away from the headstock.

It should be evident now since the condensed version of the control of the programmer has been described, that by expansion of this method of control of the programmer and the use of additional shutters and relays and similar units to that described, the chucking machine shown in FIG. 22 may be given the capability of being completely automatic and can be controlled to recycle and produce identical parts in any number and can be set up to change parts at any time.

Control lines connect the control boxes and the limit switches to the circuitry in the programmer. The control boxes 531, 532, 533, 262, 263, 264, 265, 534, 535, 536 and 537 having the lines 540, 541, 542, 543, 544, 545, 546, 547, 548, 549 and 550 while the switch 527 has the line 551, switch 521, the line 552, switch 522, the line 553, switch 520, the line 554, switch 530 the line 555 and switch 528 the line 556.

Up to this point the description has included the means and circuitry through which the machine can cause its various components to function but for reasons of simplicity and clarity has not as yet described the automatic control circuits used to control fully complete automatic operation.

In FIG. 1 is shown the machine console within which is enclosed the programmed controller with its attendant control drum 35, various control knobs, the relays, wiring and switches. This console represents that one console which is used with the system of FIG. 22.

Under END POINT COMMAND are the switches 1LS, 2LS, 3LS, 4LS, 5LS, 6LS, LS OPENS-CLOSES and a dwell switch DWL. These just mentioned switches are similar to those first described as SS1–SS3 in FIG. 5, their only difference being that while the SS switches had included in their circuits the holding neon lamps NG1–NG4, the LS switches as represented in FIG. 6 do not. The 1LS–6LS switches are not required to be held through several indexes as the SS1–SS3 would.

In FIG. 6, 1LS is a double pole switch which when closed connects the line 218, which is the positive supply line, through its upper switch arm to the line 600 to solenoid SOL15 and then to the minus side line 221. Its lower switch arm connects 218 to line 601, solenoid SOL16 and line 221, 2LS connects line 218 to 600 and SOL15. 3LS connects line 218 upper arm to line 602 and SOL17 while its lower arm connects to line 600 AND SOL15. Upper arm of 4LS connects to line 601 while the lower arm connects to line 602. 5LS connects to line 602 while 6LS connects to line 601. The LS OPENS-CLOSES switch connects line 218 to line 603 and SOL18 to line 221. Dwell switch DWL connects 218 to line 604, SOL19 and line 221.

The solenoids SOL15–SOL19 have fingers 97 to engage shutter extensions 104 of shutters 38 when they are energized as previously described for the other solenoids SOL1–SOL4. Similarly, as shown in FIG. 9, photoconductive cells 15FR–19FR, as well as transistors T15–T19 are used in the circuitry to energize relays 15CR–19CR, which are comparable to the previously described relays 1CR–4CR. Similarly these transistors T15–T19 will pass current from the line 217, when their photoconductive cells FR respond to light through an open shutter 38 to their lines 615, 616, 617, 618 and 619 to the relays shown in FIG. 10 as 15CR, 16CR, 17CR, 18CR, 18ACR, 19CR and 23CR respectively, the other side of the relay windings all being connected to the other side of the line 216.

Referring now to FIG. 22, as has been explained, various limit switches to determine or indicate the limit of travel, such as a slide or carriage are used, namely 520, 521, 522, 527, 528 and 530. These are indicated in the diagram of FIG. 10 for an example of an automatic operation and have a definite relationship to the LS switches in FIG. 6 and shown on the console in FIG. 1.

For example, to set up the command for limit switch 528, 1LS is used, for 530 2LS is used, for 527, 3LS is used, for 521, 4LS is used, for 520, 5LS is used, for 522, 6LS is used. The LS OPENS-CLOSES switch is used to enter the command on whether the other LS switches are entered as opened or closed for their function. In some instances, it is necessary to make a switch index, the drum on the opposite or opening side of the switch where the switch, let us say, will already be tripped when the drum indexes and the next index should be signalled from the switch reclosing. This is accomplished by the OPENS-CLOSES LS switch in combination with the 18CR and 18ACR relays. The chart shown in FIG. 8 shows that when the LS switch opens the relay 18CR is energized and when LS closes the relay 18CR is deenergized.

The relays 15CR, 16CR and 17CR are controlled in various combinations by the limit switches 528, 530, 527, 521, 520 and 522, as shown in the combination chart of FIG. 7. As indicated in FIG. 7, when switch 528 is selected to index, the drum relays 15CR and 16CR would be energized as indicated by the "*x*" in the circle of those boxes while relay 17CR would be deenergized as indicated by the open circle. If 530 is selected 15CR would be energized while 16CR and 17CR would be deenergized, etc. for the rest of the limit switches 527, 521, 520 and 522.

For example, if limit switch 521 is the switch we wish to select to index the drum 35, during set up we close the double pole switch 4LS on the console panel. This energizes the solenoids SOL16 and SOL17. Their plunger ends or fingers 97 are raised to open their corresponding shutters 38 and they are entered on the drum as a command as has been described. Later when the machine is operating automatically and this row comes up, the relays 16CR and 17CR will be energized. All of the other switches 1LS, 2LS, 3LS, 5LS, 6LS, OPENS-CLOSES LS, DWL and CYCLE END switch SS4 would be entered similarly and energize their particular relay or relays when their row in automatic operation comes up.

*Automatic operation*

Observing FIGS. 1 and 10, a CYCLE START button switch PB3 is provided and when pushed will start the automatic cycle by energizing the relay 27CR, the switch 210$^6$ of course being in AUTO position and the relays 15CR and 16CR and 17CR in deenergized condition. Current will then flow from the line 198, switch 210$^6$, to the line 625, closed cycle start switch PB3, line 626, closed contactor 17CR1, line 627, closed contactor 15CR1, line 627, closed contactor 16CR1, line 628, closed contactor 19CR2, line 629, cam switch 2TD1, line 630, relay winding 27CR and to the other side, line 199, thus energizing this relay 27CR. Holding contactor 27CR6 now closed will hold the relay 27CR energized when the button switch PB3 is released by passing current from line 625 to line 626 around the now open switch PB3. Current also now flows to a timer motor 2TD from the line 629, which as described above is now connected to the current supply line 198 and to the other side, line 199, and this motor is now in operation to time the duration of energization of the relay 27CR to step drum as follows:

Current from line 198 flows to now closed contactor 27CR4 line 631, motor 7TD and to the other side line 199 energizing it. As soon as motor 7TD is energized, one of its contactors 7TD3 closes to energize a relay 23CR by connecting current from line 217 to winding of relay 23CR, the other side being connected to line 216. This relay 23CR then holds the relay 27CR energized to keep motor 7TD running until it can send the correct number of pulses through its contactors 7TD1 and 7TD2, FIG. 4, to the stepping motor MTR6 to index the drum to its next row of commands. Note here that relay 27CR has its contactors 27CR2 and 27CR3 now closed to supply current from the lines 246 and 247 to the contactors 7TD1 and 7TD2. After the correct number pulses to index, contact 7TD3 opens to deenergize solenoid 23CR causing its contactor 23CR1 to open, to thus deenergize relay 27CR and open the circuit to timer motor 7TD. As soon as indexing takes place, some one or other of the relays 15CR, 16CR or 17CR will be energized as can be seen in FIG. 7, having been entered previously as a command. This means that the original series circuit of current flow through their closed contactors 15CR1, 16CR1 and 17CR1 to relay 27CR has been broken and as indexing is completed, relay 27CR will deenergize upon opening of the contactor 23CR1.

If we now assume as before that in this row the 4LS switch was closed to enter a command in FIG. 22, we will see that this is the command controlling the limit switch 521 and when the cross slide 503 carries the turret 504 toward the spindle 506, the stop screw 518 will move toward the limit switch 521 until it engages and moves it to open position, signalling completion of its operation and telling the circuitry to move on to its next command.

As just explained, the drum has now just been indexed to a new row of commands, the cross slide motor through other motor commands, not specifically described but similarly entered, is driving cross slide motor 510 to make the cross slide move away from spindle, and when the limit switch 521 is opened the following takes place: In FIG. 10, current flows from switch 210$^6$, line 625, limit switch 521, upper contact to line 632, closed contactor 18ACR3, line 633, now closed, contactor 17CR6, line 634, closed contactor 15CR2, line 635, now closed contactor 16CR2, line 628, contactor 19CR2, line 629, closed switch 2TD1, line 630, winding of relay 27CR and to the other side, line 199 thus activating indexing to take place as just previously explained. Note according to the chart in FIG. 7 that the relays 16CR and 17CR were in energized condition to complete with closed contacts the circuit just described.

Indexing will now take place and bring up a new row of commands, these in turn after each index triggering the next set of commands until Cycle End command comes up. This occurs, as has been explained, by activation of the photo sensitive resistor 4FR to energize the Cycle End relay 4CR and bring the drum to home position ready for automatic repeat of the commands.

While the automatic operation has only used the limit switch 521 and the end point command switch 4LS in this description, for example, the operation of all of the other limit and end point command switches 1LS–6LS would be similar in operation, this single demonstration being deemed sufficient.

The purpose of the OPENS-CLOSES LS switch has already been described so will not be repeated. The DWELL switch controlling the command for energization of the relay 19CR is entered as any of the other LS switches are and may be used when a delay is wanted where a tool will stay in its final position for a few seconds for accurate sizing. When used the relay 19CR will be energized like any of the other relays are on command and its contactors 19CR1 will close while its contactor 19CR2 will open. Closing of 19CR1 energizes the timer motor 1TD cutting off the motor 2TD and relay 27CR for a period of time, delaying indexing from taking place. When the period of time elapses and cam switch 1TD1 closes, normal indexing then takes place.

From the foregoing description it should be obvious that the controller is capable of receiving and entering a large variety and number of commands and has the capability to dispatch these commands in orderly fashion to automatically control a machine to perform a particular function repetitively any number of times without any human intervention except to initiate its cycle. At the same time it has the flexibility of altering commands or completely changing them with the simple ease of pushing switches. The particular examples given should not be construed as being limitations on its capabilities of use.

It will be understood that various changes in the details, materials and arrangements of parts which have been herein described and illustrated in order to explain the nature of the invention may be made by those skilled in the art within the principle and scope of the invention as expressed in the appended claims.

We claim:

1. An automatic selectively programmed controller for actuating and cycling the operation of an electrically energized machine, and for controlling the same which comprises:

light responsive electrical switching means for controlling the energy supplied to said machine;

illuminating means spaced from, alined with, and positioned to illuminate said light responsive means;

a drum having its wall interposed between said light responsive and illuminating means and supported for rotation, a plurality of shutters arranged on and carried by said drum, said shutters being capable of assuming a block and an illuminating position for selectively blocking and admitting illumination of said light responsive means by said illuminating means,
means for selectively operating said shutters to assume said one of said positions,
motive means for rotating said drum and thereby interpose consecutively and successively said shutters to energize said machine in accordance with the positions of said shutters.

2. The controller, according to claim 1, wherein said light responsive means includes photosensitive resistors.

3. The controller, according to claim 2, wherein said motive means also includes an index control for step movement of said drum.

4. The controller, according to claim 3, further including holding light means adjacent said light responsive means operable for illuminating said responsive means only when said drum is being indexed.

5. The controller, according to claim 3, further including holding light means adjacent said light responsive means operable for illuminating said responsive means when said drum is at rest and manual operation is desired.

6. The controller, according to claim 5, wherein said holding light means includes:
a neon bulb for each photosensitive resistor,
and switch means operable to illuminate a selected neon bulb when said drum is as rest and said controller is in manual condition.

7. The controller, according to claim 4, wherein said holding light means includes:
a neon bulb for each photosensitive resistor,
and switch means operable to cause illumination of selected neon bulbs when said drum is indexed.

8. The controller, according to claim 1, wherein said light responsive switching means includes a series loop having connected therein:
a voltage source,
a resistance,
a photosensitive resistor,
a transistor having a base, a collector and an emitter electrode,
the junction of said resistance and said photosensitive resistor connected to said base,
a relay having a coil and contacts operable thereby,
a second loop having connected in series therein said emitter, said collector, another voltage source and said relay coil, whereby said contacts when connected in the electrical supply to said machine will control the energization of said machine.

9. The controller, according to claim 8, wherein said means for selectively operating said shutters includes clearing bar means for initially closing said shutters and a command entering means for opening selected shutters.

10. The controller, according to claim 9, wherein said clearing bar means also includes a series of clearing fingers carried by a bar,
said bar capable of assuming two positions,
one of said positions causing said fingers to engage said shutters and close them, in the other position said fingers disengage from said shutters,
and bar motive means for selectively moving said bar into one of said positions.

11. The controller, according to claim 10, wherein said command entering means includes a series of solenoids supported adjacent said drum,
rod means coupled to said solenoids for moving said solenoids into two positions, whereby when said solenoids are energized their armatures will engage and open said shutters when said solenoids are moved into one of said positions.

12. The controller, according to claim 11, further including homing means for rotating said drum to its initial homing position after its cycle of operation has been completed.

13. The controller, according to claim 12, wherein said motive means is a synchronous motor and said controller further includes a source of pulsed direct current for supplying said motor whereby said motor will impart to said drum stepped rotation when energized by said pulsed source.

14. The controller, according to claim 13, further including a source of alternating current and supply switching means for selectively and automatically connecting one of said sources to said synchronous motor.

15. An automatic selectively programmed controller for actuating and cycling the operation of an electrically energized machine and for controlling the same which comprises:
a hollow drum supported for rotation about its longitudinal axis,
the wall of said drum having openings therethrough arranged in longitudinal rows,
an individual shutter for each of said openings,
said shutters carried by said drum and movable to selectively cover and uncover said openings,
means for selectively moving said shutters to uncover said openings,
a holder disposed, spaced from and supported within said drum and having a row of spaced apart recesses alined with one of the rows of said openings,
a photosensitive resistor disposed in each of said recesses with a sensitive portion thereof directed outwardly of said recess in a direction toward said drum,
a row of spaced apart illuminating sources alined with said row of recesses and disposed and supported on the side of said drum opposite said holder, whereby said openings are intermediate said sources and said recesses,
motor means for selected stepwise rotation of said drum whereby successive rows of openings will be interposed between said recesses and said sources,
circuit switching means electrically connected between said resistors and said machine for energizing said machine in accordance with the illumination of said resistors whereby the activity of said machine will be controlled by the positions of said shutters as the drum is rotated.

16. The controller, according to claim 15, wherein said means for selectively moving said shutters includes a clearing bar for moving all the shutters of one row to cover said openings,
a row of solenoids having their armatures when energized, alined for engagement with and movement of said shutters to uncover said openings of one of said rows whereby for successive rows the shutters of one row are all covering the openings and then moving selected shutters by said solenoids in the row to uncover selected openings.

17. The controller according to claim 16, wherein said holder further includes a light source for each resistor directed to illuminate the resistor when said shutters cover said openings,
and switch means to illuminate said light source.

18. The controller, according to claim 16, wherein said holder further includes a holding light source for each resistor directed to illuminate the resistor.

19. The controller according to claim 18, further including switching means for activating said holding source only during step rotational movement of said drum.

20. The controller according to claim 19, wherein said motor means includes a source of successive pulses of direct current and a synchronous motor energized by said source of pulses.

21. The controller, according to claim 20, wherein said circuit switch means includes a series loop having connected therein:
a voltage source,
a resistance,
said photosensitive resistor, a transistor having a base, a collector, and an emitter electrode, the junction of said resistance and said photosensitive resistor connected to said base, a relay having a coil and contacts operable thereby, a second loop having connected in series therein said emitter, said collector, another voltage source and said relay coil whereby the activity of said contacts control the energization of said machine.

22. The controller, according to claim 21, further including indexing initiating means electrically connected to said source of pulses for initiating the stepping of said drum.

23. The controller, according to claim 22, wherein a portion of said initiating means is carried by and activated by the movement of said machine.

24. The controller, according to claim 23, wherein said portion of said initiating means are micro switches.

References Cited by the Examiner

UNITED STATES PATENTS

| | | | |
|---|---|---|---|
| 2,541,247 | 2/1951 | Herr | 250—219 |
| 2,921,204 | 1/1960 | Hastings et al. | 250—237 X |
| 2,947,876 | 8/1960 | Larew | 250—219 |
| 2,993,999 | 7/1961 | Kay et al. | 250—219 |
| 3,023,318 | 2/1962 | Jones | 88—1 |
| 3,055,582 | 9/1962 | Battison et al. | 250—219 X |
| 3,057,552 | 10/1962 | Hanstein et al. | 340—247 X |

RALPH G. NILSON, *Primary Examiner.*

WALTER STOLWEIN, *Examiner.*